(12) United States Patent
Collier

(10) Patent No.: US 8,986,001 B2
(45) Date of Patent: Mar. 24, 2015

(54) BURNER WITH IMPROVED HEAT RECUPERATOR

(75) Inventor: David Collier, Rockford, IL (US)

(73) Assignee: Eclipse, Inc., Rockford, IL (US)

( * ) Notice: Subject to any disclaimer, the term of this patent is extended or adjusted under 35 U.S.C. 154(b) by 1111 days.

(21) Appl. No.: 12/969,846

(22) Filed: Dec. 16, 2010

(65) Prior Publication Data

US 2011/0143292 A1 Jun. 16, 2011

Related U.S. Application Data

(60) Provisional application No. 61/287,061, filed on Dec. 16, 2009.

(51) Int. Cl.
  *F23D 14/66* (2006.01)
  *F28F 1/16* (2006.01)
  *F23L 15/04* (2006.01)

(52) U.S. Cl.
  CPC . *F28F 1/16* (2013.01); *F23D 14/66* (2013.01); *F23L 15/04* (2013.01)
  USPC ............ 431/215; 431/211; 165/182; 165/154

(58) Field of Classification Search
  USPC .............. 165/154, 109.1, 141, 155, 156, 169, 165/182; 431/215, 211; 126/91 A
  See application file for complete search history.

(56) References Cited

U.S. PATENT DOCUMENTS

| 3,487,670 A | 1/1970 | Ware |
| 4,216,826 A | 8/1980 | Fujikake |
| 4,298,333 A | 11/1981 | Wunning |
| 4,877,396 A | 10/1989 | Wunning |
| 5,070,937 A | 12/1991 | Mougin et al. |
| 5,326,255 A | 7/1994 | Wunning |

(Continued)

FOREIGN PATENT DOCUMENTS

| DE | 29923473 U1 | 9/2000 |
| EP | 0398252 A2 | 11/1990 |
| EP | 0743500 A2 | 11/1996 |

(Continued)

OTHER PUBLICATIONS

U.S. Patent & Trademark Office, International Search Report and Written Opinion in International Patent Application No. PCT/US2010/060743 (Mar. 15, 2011).

(Continued)

*Primary Examiner* — Alfred Basichas
(74) *Attorney, Agent, or Firm* — Leydig, Voit & Mayer, Ltd.

(57) ABSTRACT

A burner and an improved heat recuperator for a burner. The heat recuperator has a tubular body including a plurality of fins extending radially outward from the tubular body. The plurality of fins are disposed in a plurality of segments arranged longitudinally along the tubular body with the plurality of fins in each segment being disposed about a circumference of the tubular body. Adjacent segments of fins being circumferentially offset with one another.

16 Claims, 10 Drawing Sheets

(56) References Cited

U.S. PATENT DOCUMENTS

| | | | |
|---|---|---|---|
| 5,577,555 | A | 11/1996 | Hisajima et al. |
| 5,833,450 | A | 11/1998 | Wunning |
| 6,488,079 | B2 | 12/2002 | Zifferer |
| 6,808,017 | B1 | 10/2004 | Kaellis |
| 7,029,271 | B2 | 4/2006 | Wunning et al. |
| 2005/0014102 | A1 | 1/2005 | Harbeck et al. |
| 2007/0144179 | A1 | 6/2007 | Pinard et al. |
| 2008/0023180 | A1 | 1/2008 | Bunker et al. |
| 2008/0271877 | A1 | 11/2008 | Glass |

FOREIGN PATENT DOCUMENTS

| | | |
|---|---|---|
| EP | 0803696 A2 | 10/1997 |
| JP | S57-150798 A | 9/1982 |
| JP | H09-145279 A | 6/1997 |

OTHER PUBLICATIONS

European Patent Application No. 10842596.8, Search Report (Nov. 5, 2014).

BURNER WITH IMPROVED HEAT RECUPERATOR

CROSS-REFERENCE TO RELATED APPLICATIONS

This patent application claims the benefit of U.S. Provisional Patent Application No. 61/287,061, filed Dec. 16, 2009, which is incorporated by reference in its entirety herein.

BACKGROUND

Recuperator burners are known. Such burners typically incorporate a recuperator sleeve of ceramic material or the like that is disposed in spaced-apart surrounding relation to an axial gaseous fuel supply tube leading to a burner head. Combustion air travels along the annulus between the fuel supply tube and the recuperator sleeve for combustion with the gaseous fuel at the burner head. A portion of the combustion product gases travels back over the exterior of the recuperator sleeve in counter-current flow to the combustion air. Due to the high temperature of the combustion product gases, the recuperator sleeve becomes heated. Accordingly, the combustion air traveling through the interior of the recuperator sleeve also increases in temperature. The increased temperature of the combustion air promotes improved combustion at the burner head.

It is desirable to improve the heat transfer across the recuperator sleeve. To provide such improved heat transfer, past recuperator sleeves have incorporated various contoured surface arrangements having arrangements of outwardly projecting hollow protrusions. While such prior contoured surface recuperator sleeves have been somewhat successful, they have relied generally on surface protrusions that form relatively wide angles with one another. That is, the protrusions of prior devices form surfaces that are at relatively shallow angles relative to the base surface of the sleeve.

SUMMARY

The present invention relates generally to a burner incorporating a heat recuperator, and more particularly, to a burner incorporating a ceramic heat recuperator of elongated tubular construction incorporating an arrangement of high angle surface fins in combination with depressions in the form of partial ring segments oriented circumferentially at positions along the recuperator between fin segments. The recuperator is adapted to transfer heat from high temperature combustion product gases traveling along the exterior to lower temperature combustion air flowing through the interior. The arrangement of fins and depressed partial ring segments provides highly efficient heat transfer from the combustion product gases to the combustion air.

In accordance with one exemplary construction, advantages and alternatives over the prior art are provided by a recuperator incorporating an arrangement of relatively steep angle fins projecting outwardly from the outer surface for engagement with the hot combustion product gases. The fins are arranged in a stacked gear ring pattern. The fins in alternate rings are offset from one another circumferentially to provide a tortured flow conveyance path along the exterior surface. Between the gear tooth rings, depressions in the form of partial ring segments extend partially about the circumference. The depressions define corresponding underlying surface irregularities at the interior of the recuperator to define contact surfaces for the combustion air to further aid in heat transfer to the combustion air. The depressions are staggered along the length of the recuperator to provide a tortured flow conveyance path along the interior surface.

In an embodiment of an improved heat recuperator for a burner, the heat recuperator has a tubular body including a plurality of fins extending radially outward from the tubular body. The plurality of fins are disposed in a plurality of segments arranged longitudinally along the tubular body with the plurality of fins in each segment being disposed about a circumference of the tubular body. Adjacent segments of fins are circumferentially offset with one another.

In another embodiment of an improved heat recuperator, the heat recuperator has a tubular body including a plurality of fins extending radially outward from the tubular body. The plurality of fins are disposed longitudinally and circumferentially along the tubular body with adjacent fins in the longitudinal direction being circumferentially offset with one another. A plurality of depressions are disposed on the tubular body.

In an embodiment of a burner, the burner can include an exhaust housing, a recuperator, and a fuel tube. The recuperator is coupled to the exhaust housing. The recuperator has a tubular body and a nozzle. The tubular body includes a plurality of fins extending radially outward from the tubular body with the plurality of fins being disposed in a plurality of segments arranged longitudinally along the tubular body. The plurality of fins in each segment are disposed about a circumference of the tubular body. Adjacent segments of fins are circumferentially offset with one another. The fuel tube is disposed within the tubular body and includes a burner head.

DETAILED DESCRIPTION

Figure 1:
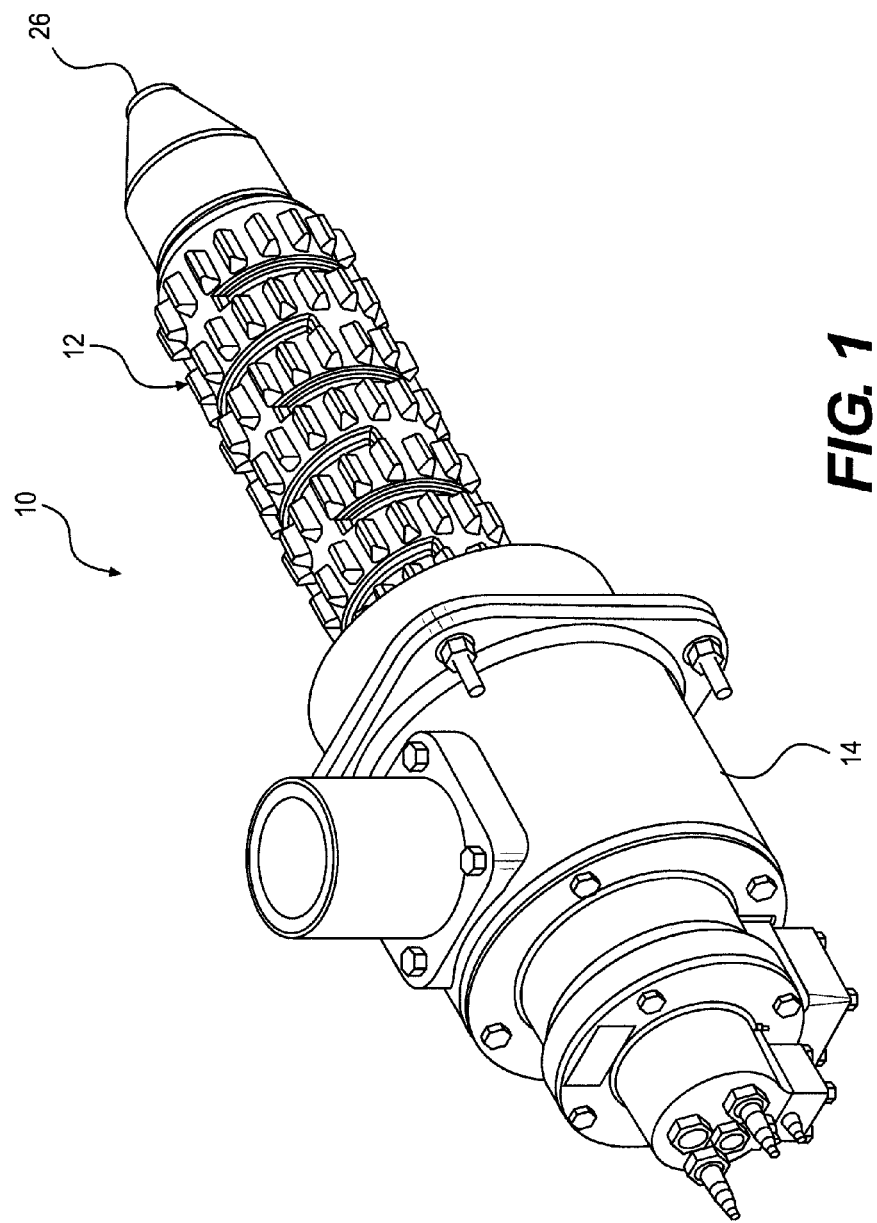
FIG. 1 is a schematic perspective view illustrating an exemplary burner incorporating a recuperator consistent with the present disclosure.
Figure 2:
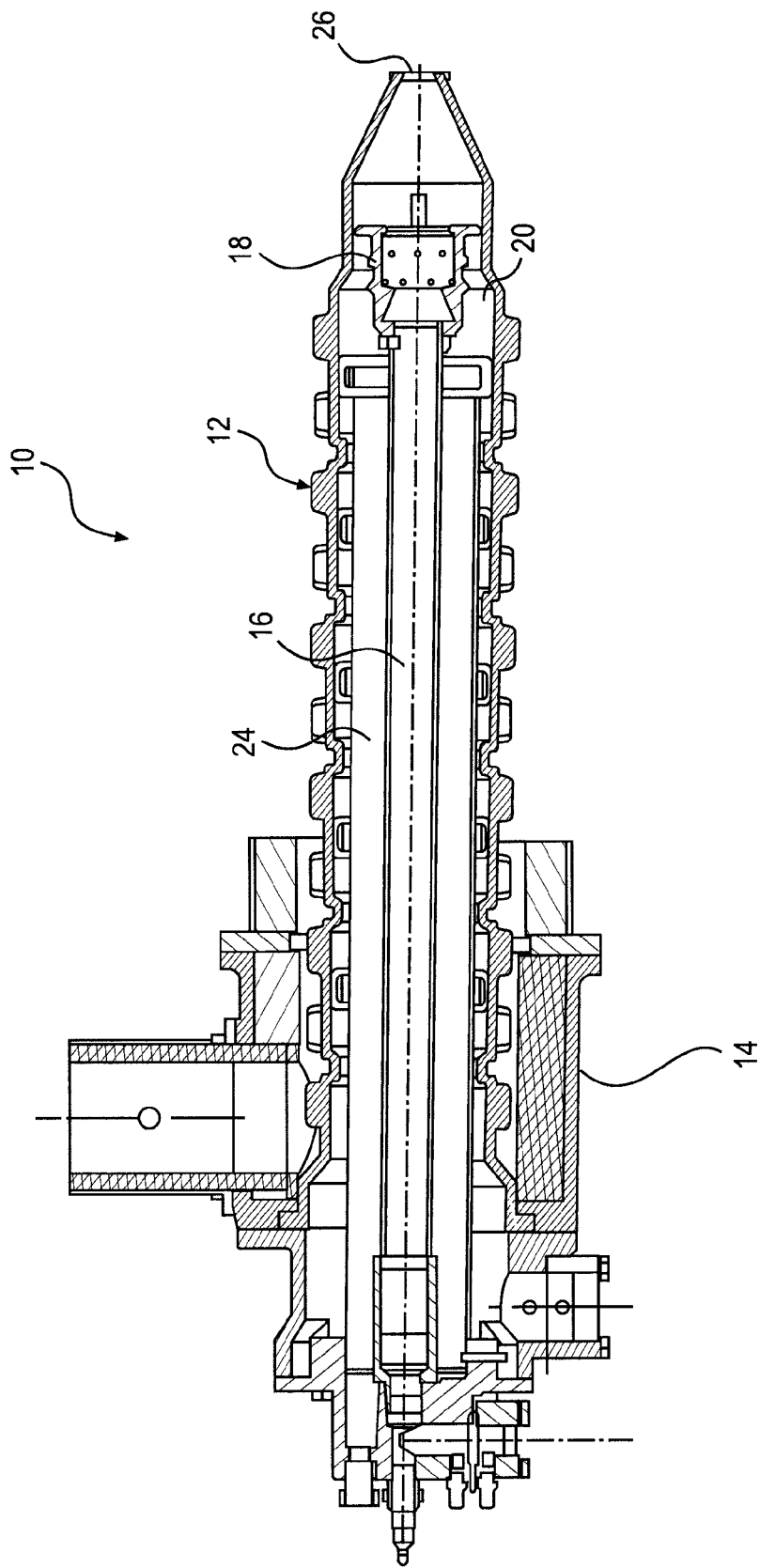
FIG. 2 is a cut-away schematic view of the exemplary burner in FIG. 1.
Figure 3:
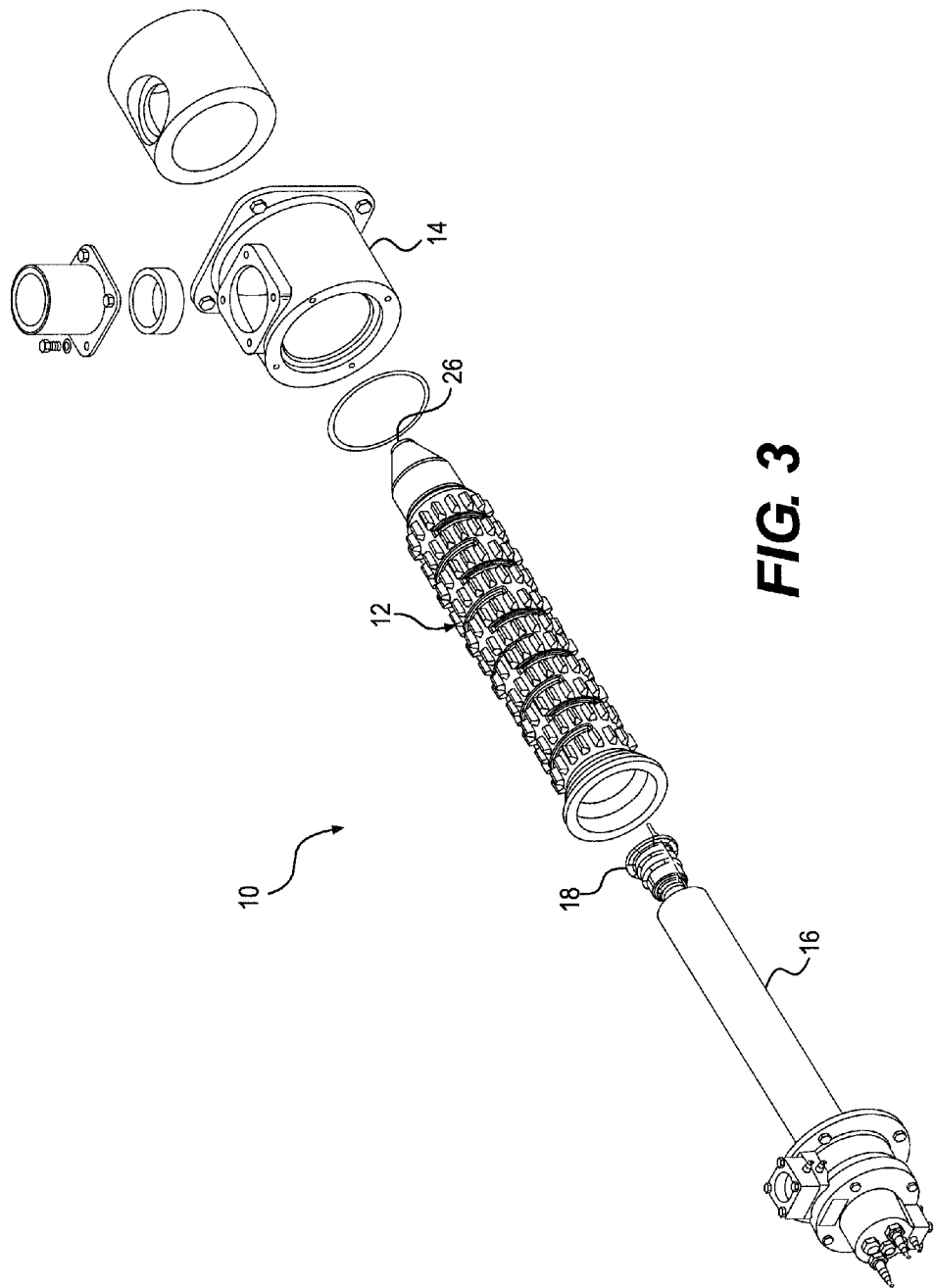
FIG. 3 is an exploded schematic assembly view of the exemplary burner in FIG. 1.

Reference will now be made to the drawings wherein like elements are designated by like reference numbers in the various views. FIG. 1 illustrates an exemplary burner 10 including a generally hollow tubular recuperator 12 extending outwardly from an exhaust housing 14. As seen through joint reference to FIGS. 2 and 3, the recuperator 12 surrounds a fuel tube 16 feeding a burner head 18 within a combustion chamber 20. Combustion air passes along an annular conduit 24 between the fuel tube 16 and the inner surface of the recuperator 12 for delivery to the combustion chamber 20. At the combustion chamber 20, the combustion air reacts with the fuel in an oxidation reaction to generate hot combustion gases which exit into a furnace (not shown) through a nozzle 26.

Figure 4:
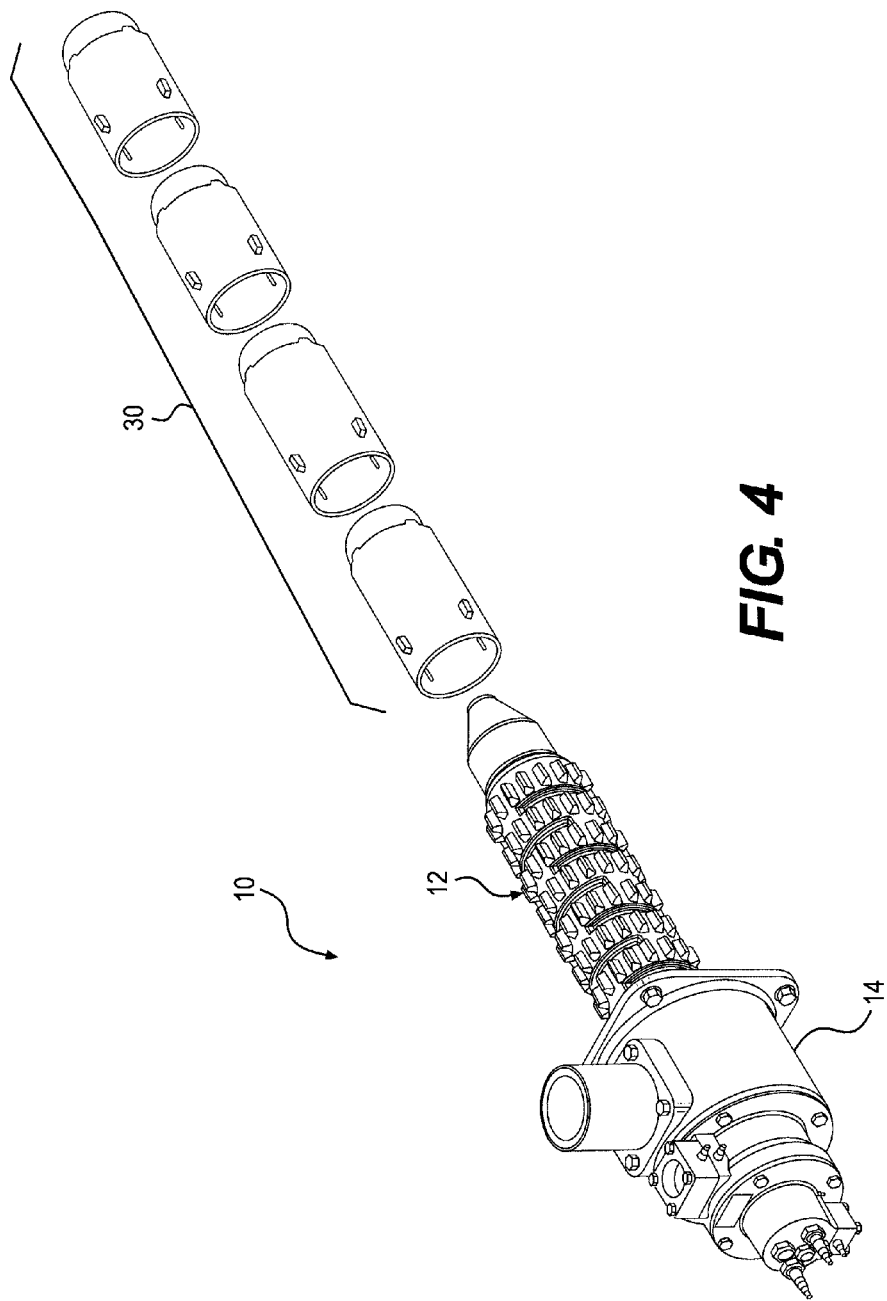
FIG. 4 is an exploded perspective schematic view illustrating the placement of the recuperator axially within a cover tube.

As shown in FIG. 4, the recuperator 12 normally extends in substantially axial relation along a cover tube assembly 30 which may be of either a multi-piece or unitary construction. A closed end extension tube may be provided if indirect heating is desired. In operation, at least a portion of the heated combustion product gases generated by the burner travel back to the exhaust housing 14 along a travel path between the outer surface of the recuperator 12 and the inner surface of the cover tube assembly 30. Thus, the heated combustion product gases traveling to the exhaust housing 14 move in countercurrent flow relative to the combustion air with the walls of the recuperator forming a divider between the two gas flow streams.

The recuperator 12 is preferably formed from a material, such as a ceramic material, to substantially resist thermal fatigue and deformation. By way of example only, and not limitation, one material which may be particularly useful is reaction bonded silicon carbide, although other suitable materials may likewise be used if desired. According to one potentially suitable practice, it has been found that the recuperator 12 may be formed by slip casting methods. However, other formation techniques may be used if desired.

Figure 5:
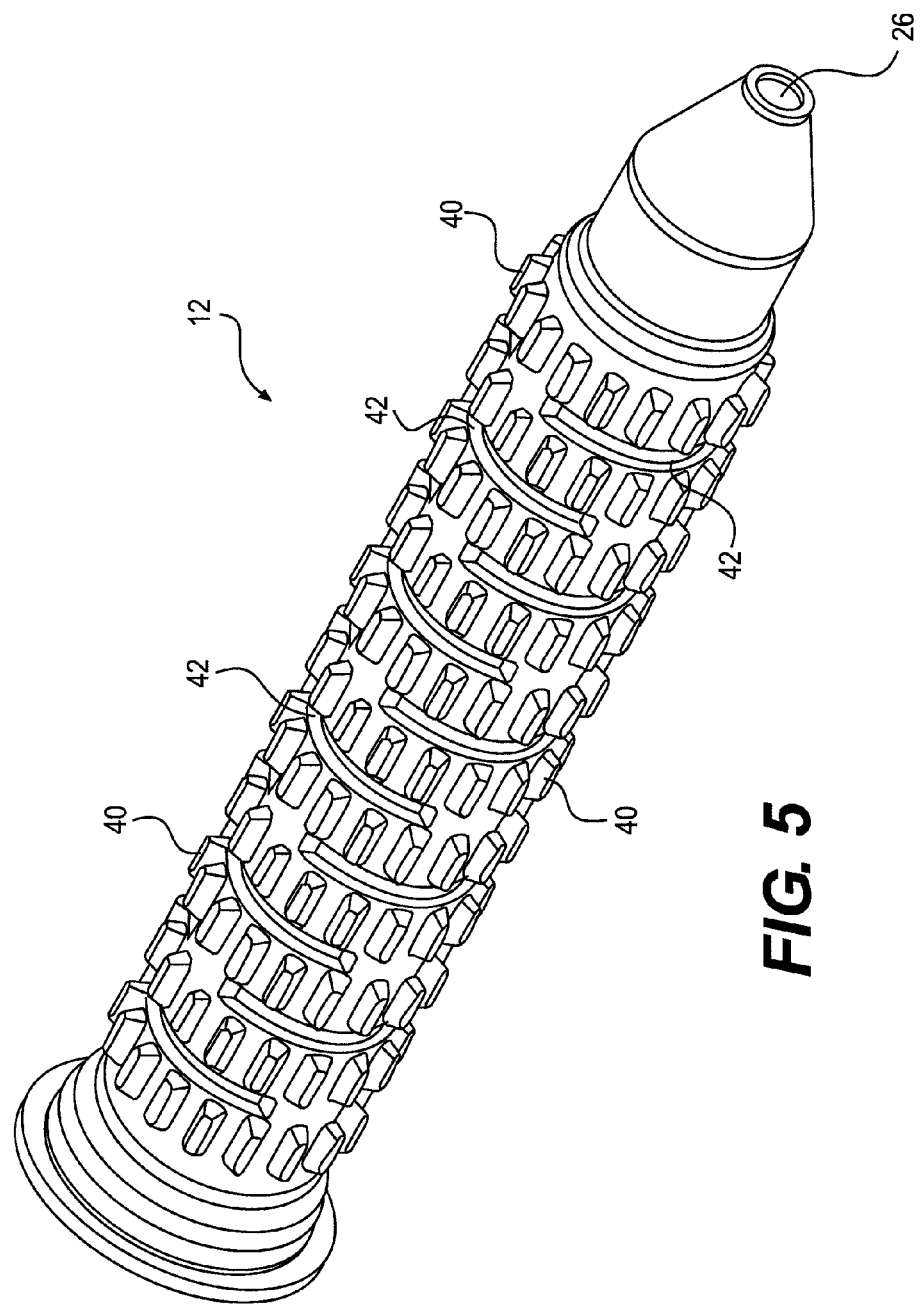
FIG. 5 is a schematic perspective view of a recuperator consistent with the present disclosure.
Figure 6:
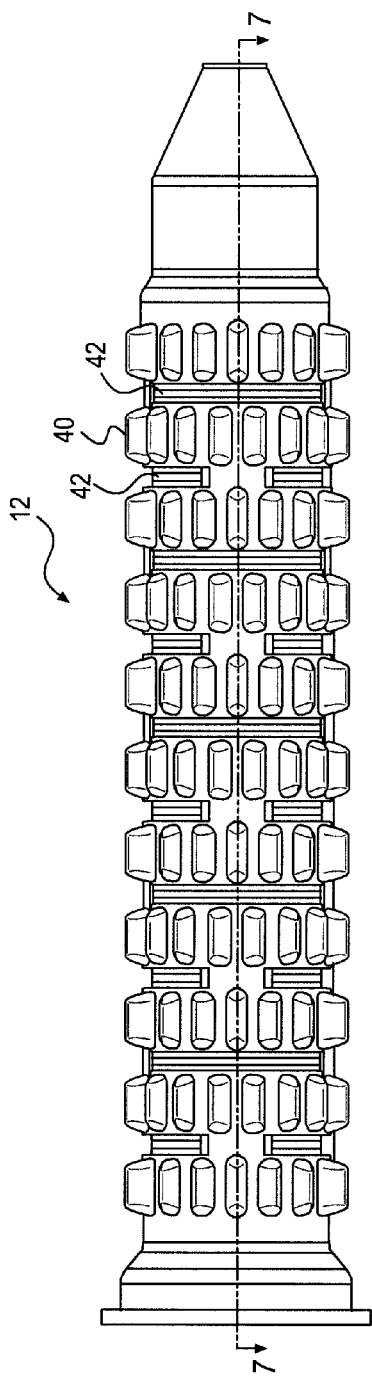
FIG. 6 is a side view of the recuperator of FIG. 5.
Figure 7:
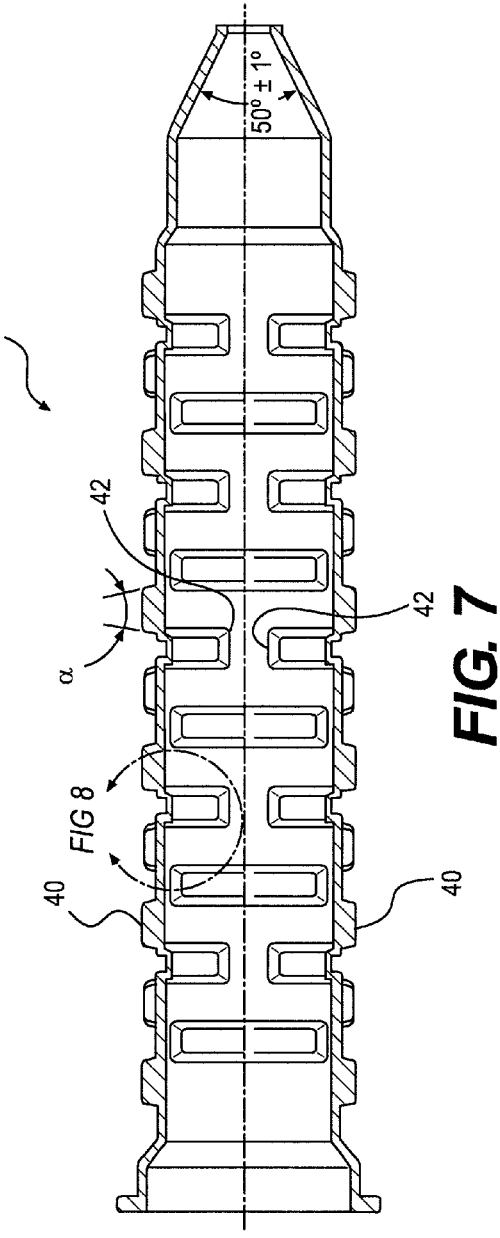
FIG. 7 is a section view of the recuperator of FIG. 5 taken through line 7-7.
Figure 11:
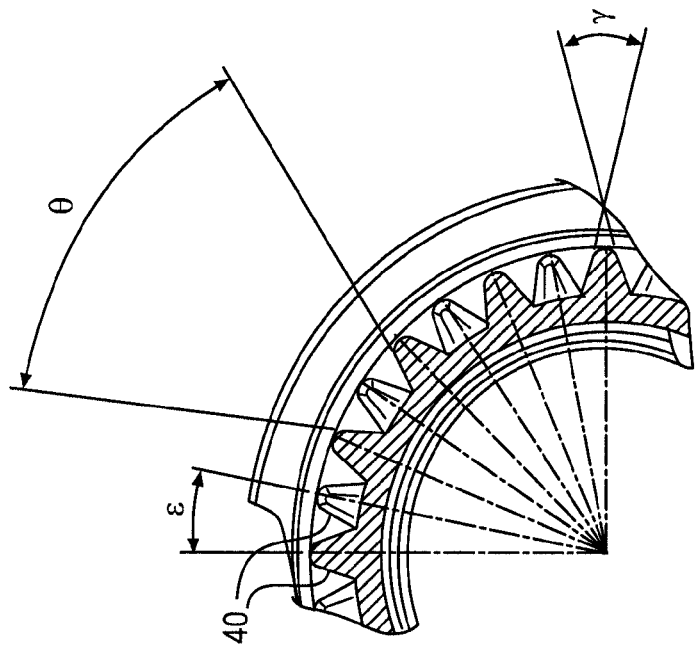
FIG. 11 is an enlarged fragmentary sectional view of a portion of the recuperator of FIG. 5 taken from FIG. 10.
Figure 10:
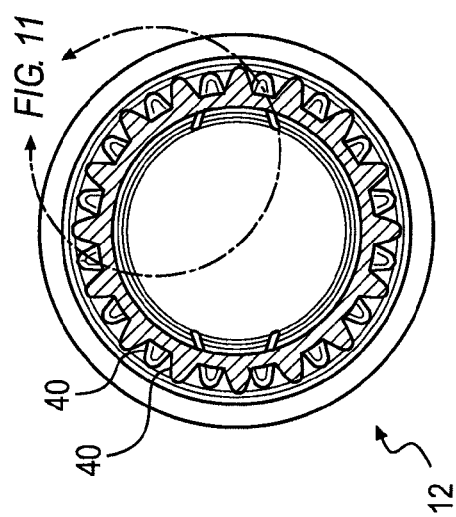
FIG. 10 is a section view of the recuperator of FIG. 5 taken through line 10-10 in FIG. 9.
Figure 13:
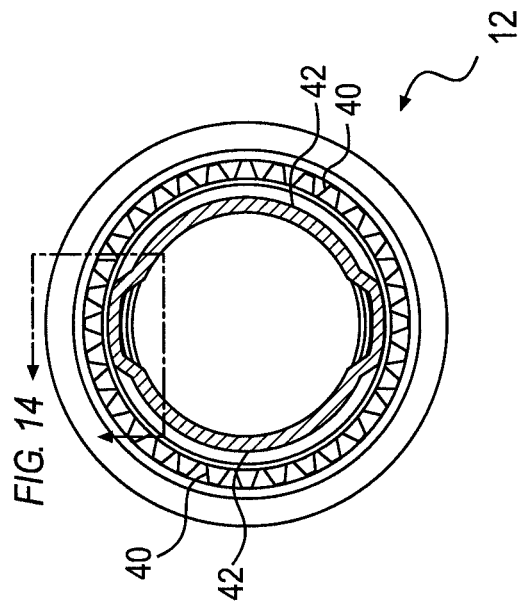
FIG. 13 is a section view of the recuperator of FIG. 5 taken through line 13-13 in FIG. 9.
Figure 12:
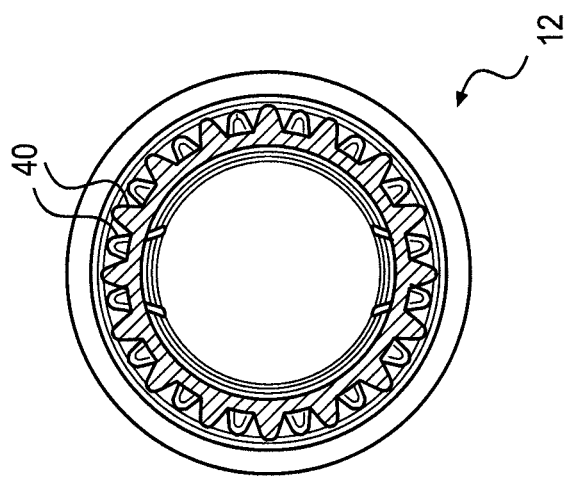
FIG. 12 is a section view of the recuperator of FIG. 5 taken through line 12-12 in FIG. 9.
Figure 15:
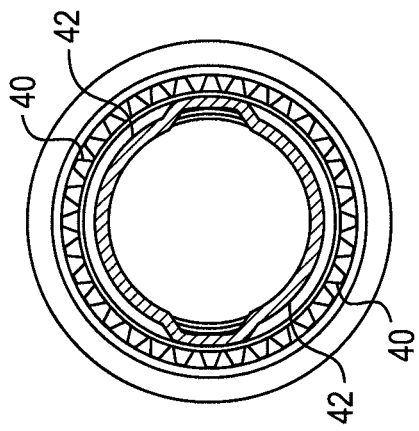
FIG. 15 is a section view of the recuperator of FIG. 6 taken through line 15-15 in FIG. 9.

Referring now to FIGS. 5 and 6, as noted previously, the recuperator 12 includes a multiplicity of raised fins 40 projecting from an outer surface. In the illustrated embodiment, the fins 40 are oriented substantially longitudinally with respect to the length dimension of the recuperator 12. In the illustrated embodiment, the fins 40 are arranged in a stacked gear ring configuration with each segment of the stacked configuration defining a ring of fins extending circumferentially about the recuperator 12. As shown, the fins in every other ring are in substantial alignment with one another while the fins in adjacent rings are misaligned by an angle $\epsilon$ shown in FIG. 11. The angle $\epsilon$ can be any suitable angle. In some embodiments, the angle $\epsilon$ can be approximately 11.3 degrees. This arrangement provides a tortuous conveyance path for the heated combustion product gases passing over the exterior of the recuperator so as to promote heat transfer. Referring to FIGS. 6-15, the fins 40 can project outwardly at a relatively steep angle. For example, as shown in FIG. 11, the major surfaces of the fins can extend outward at an angle $\gamma$. The angle $\gamma$ can be any suitable angle. In some embodiments, the angle $\gamma$ can be about 30 degrees, although as noted, it is contemplated that other angles may be used. Likewise, minor surfaces of the fins can extend at angle $\alpha$, which can be a relatively steep angle. The angle $\alpha$ can be any suitable angle, and in some embodiments, the angle $\alpha$ can be equivalent to the angle $\gamma$. In some embodiments, the angle $\alpha$ can be about 30 degrees, although as noted, it is contemplated that other angles may be used. Thus, the slope of the fins may be at any suitable angle.

Figure 14:
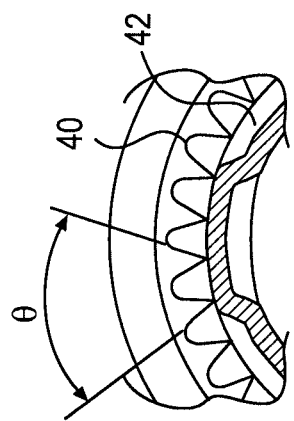
FIG. 14 is an enlarged fragmentary sectional view of a portion of the recuperator of FIG. 5 taken from FIG. 13.

The surfaces of adjacent fins in a ring cooperatively form a relatively small angle due to the fin angles and spacing. As best seen in FIGS. 11 and 14, the angle $\theta$ formed by circumferentially adjacent teeth can be any suitable angle. In some embodiments, the angle $\theta$ can be about 52.5 degrees or less although, as noted, it is contemplated that other angles may be used. In this regard, it will be understood that steeper slopes will yield smaller angles. As shown in FIGS. 7, 8, and 10-12, the fins 40 may have a substantially solid cross-section. However, hollow fins may also be used if desired.

Figure 8:
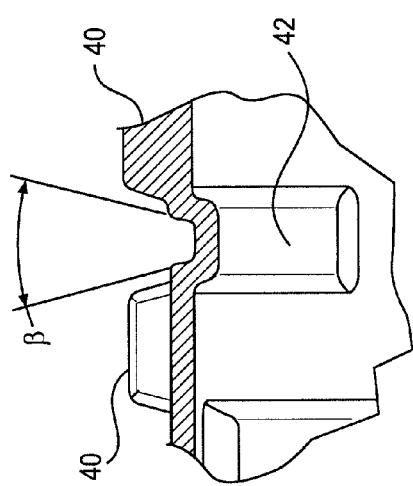
FIG. 8 is an enlarged fragmentary view of a portion of the recuperator of FIG. 5.
Figure 9:
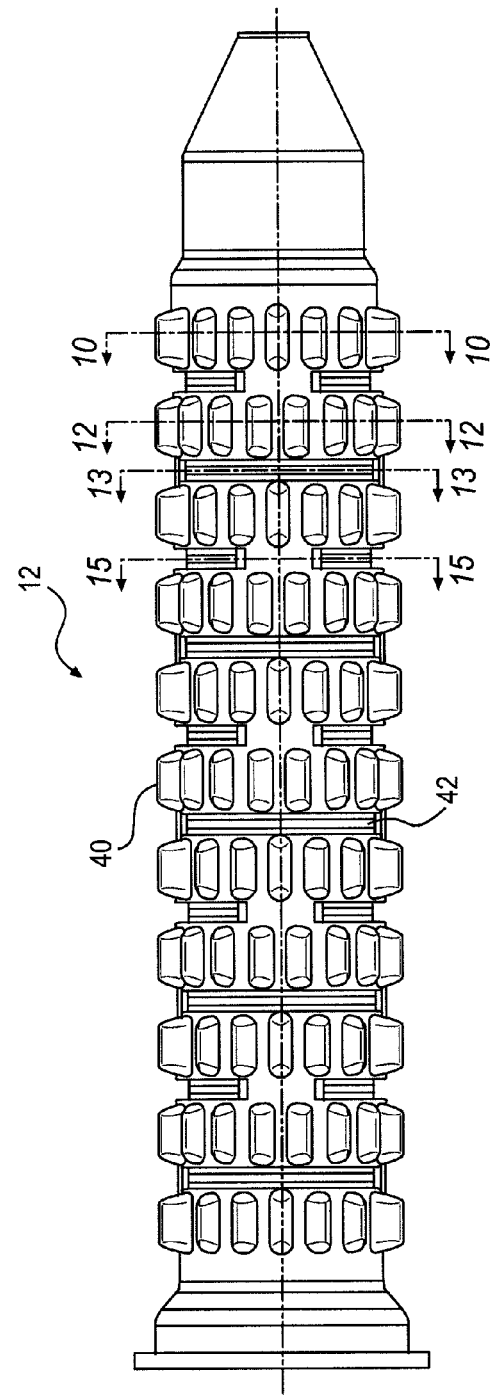
FIG. 9 is another side view of the recuperator of FIG. 5.

As shown in FIGS. 5-9 and 13-15, the recuperator 12 also includes an arrangement of ring segment depressions 42 disposed between adjacent rings of fins 40. The ring segment depressions 42 can extend partially rather than completely about the circumference of the recuperator 12 to define corresponding projections across the inner surface of the recuperator. By way of example only, according to one arrangement, the recuperator may include an opposing pair of ring segment depressions between each ring of fins to cooperatively occupy about 270 degrees or more of the full circumference of the recuperator. Of course, other arrangements may be used if desired. As shown, according to the illustrated embodiment, the ring segment depressions 42 are in substantial alignment with one another at alternating positions along the length of the recuperator, while the ring segment depressions at adjacent longitudinal positions are misaligned. This arrangement provides a tortuous conveyance path for the combustion air passing through the interior of the recuperator so as to promote heat transfer. Referring to FIG. 8, the ring segment depressions 42 can project inwardly with angled sidewalls. The ring segment depression 42 sidewalls can form an angle $\beta$. The angle $\beta$ can be any suitable angle. In some embodiments, the angle $\beta$ can be about 30 degrees, although as noted, it is contemplated that other angles may be used.

Of course, variations and modifications of the foregoing are within the scope of the present invention. Thus, it is to be understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments and equivalents to the extent permitted by the prior art.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventor for carrying out the invention. Variations of those preferred embodiments may become apparent to those of ordinary skill in the art upon reading the foregoing description. The inventor expects skilled artisans to employ such variations as appropriate, and the inventor intends for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A heat recuperator comprising:
a tubular body, the tubular body including a plurality of fins extending radially outward from the tubular body, the plurality of fins being disposed in a plurality of segments arranged longitudinally along the tubular body, the plurality of fins in each segment being disposed about a circumference of the tubular body, adjacent segments of fins being circumferentially offset with one another, the tubular body including a plurality of depressions extending radially inward from the tubular body between adjacent ring segments, at least one of the plurality of depressions being disposed between adjacent segments of fins,
wherein the at least one of the plurality of depressions extends at least partially around a circumference of the tubular body along a ring segment, the ring segment extending over a circumferential chord of the tubular body that spans over two or more fins on an adjacent ring segment.

2. The heat recuperator of claim 1 wherein the plurality of depressions are disposed partially around the circumference of the tubular body.

3. The heat recuperator of claim 2 wherein longitudinally adjacent depressions are circumferentially offset with each other.

4. The heat recuperator of claim 1 wherein at least two depressions are disposed between adjacent segments of fins.

5. The heat recuperator of claim 1 wherein the plurality of fins in each segment are substantially aligned around the circumference of the tubular body.

6. The heat recuperator of claim 1 wherein each fin of the plurality of fins extends at an angle of about 30 degrees or less.

7. The heat recuperator of claim 1 further comprising a nozzle at an end of the tubular body.

8. A heat recuperator comprising:
a tubular body, the tubular body including a plurality of fins extending radially outward from the tubular body, the plurality of fins being disposed longitudinally and circumferentially along the tubular body with adjacent fins in the longitudinal direction being circumferentially offset with one another, a plurality of depressions disposed on the tubular body and extending radially inward from the tubular body, at least one of the plurality of depressions being disposed between adjacent fins in the longitudinal direction,
wherein the at least one of the plurality of depressions extends at least partially around a circumference of the tubular body along a ring segment, the ring segment extending over a circumferential chord of the tubular body that spans over two or more adjacent fins.

9. The heat recuperator of claim 8 wherein the plurality of depressions are disposed partially around the circumference of the tubular body.

10. The heat recuperator of claim 9 wherein longitudinally adjacent depressions are circumferentially offset with each other.

11. The heat recuperator of claim 8 wherein each fin of the plurality of fins extends at an angle of about 30 degrees or less.

12. The heat recuperator of claim 8 further comprising a nozzle at an end of the tubular body.

13. A burner comprising:
an exhaust housing;
a recuperator coupled to the exhaust housing, the recuperator having a tubular body and a nozzle, the tubular body including a plurality of fins extending radially outward from the tubular body, the plurality of fins being disposed in a plurality of segments arranged longitudinally along the tubular body, the plurality of fins in each segment being disposed about a circumference of the tubular body, adjacent segments of fins being circumferentially offset with one another, the tubular body including a plurality of depressions extending radially inward from the tubular body, at least one of the plurality of depressions being disposed between adjacent segments of fins,
wherein the at least one of the plurality of depressions extends at least partially around a circumference of the tubular body along a ring segment, the ring segment extending over a circumferential chord of the tubular body that spans over two or more adjacent fins; and
a fuel tube disposed within the tubular body, the fuel tube including a burner head.

14. The burner of claim 13 wherein the plurality of depressions are disposed partially around the circumference of the tubular body.

15. The burner of claim 13 wherein the plurality of fins in each segment are substantially aligned around the circumference of the tubular body.

16. The burner of claim 13 wherein each fin of the plurality of fins extends at an angle of about 30 degrees or less.

* * * * *